US008406116B2

(12) United States Patent
Lin

(10) Patent No.: US 8,406,116 B2
(45) Date of Patent: *Mar. 26, 2013

(54) MOBILE CONFERENCING METHOD AND SYSTEM

(75) Inventor: Daniel J. Lin, San Francisco, CA (US)

(73) Assignee: Pendragon Wireless LLC, Kirkland, WA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/193,579

(22) Filed: Jul. 28, 2011

(65) Prior Publication Data

US 2011/0282960 A1 Nov. 17, 2011

Related U.S. Application Data

(63) Continuation of application No. 13/079,767, filed on Apr. 4, 2011, now Pat. No. 8,018,877, which is a continuation of application No. 12/691,594, filed on Jan. 21, 2010, now Pat. No. 7,940,704, which is a continuation of application No. 11/091,242, filed on (Continued)

(51) Int. Cl.
H04L 12/16 (2006.01)

(52) U.S. Cl. .......................... 370/206; 370/261; 709/204

(58) Field of Classification Search .................. 370/260, 370/338, 328, 252, 353, 352, 335, 342, 349, 370/389, 395.2, 400, 437; 709/204, 205, 709/206, 207, 226, 227; 455/418, 419, 456.1, 455/435, 432, 421, 412.1, 435.1, 450, 458, 455/466, 456.5, 456.2, 518, 519; 379/202.01, 379/265.05, 204.01, 100.17
See application file for complete search history.

(56) References Cited

U.S. PATENT DOCUMENTS

| 4,582,956 | A | 4/1986 | Doughty |
| 6,275,575 | B1 | 8/2001 | Wu |
| 6,564,261 | B1 | 5/2003 | Gudjonsson et al. |
| 6,885,871 | B2 | 4/2005 | Caloud |
| 6,990,352 | B2 | 1/2006 | Pyhalammi et al. |
| 7,058,036 | B1 * | 6/2006 | Yu et al. ................. 370/335 |
| 7,218,921 | B2 | 5/2007 | Mendiola et al. |
| 7,236,472 | B2 | 6/2007 | Lazaridis et al. |
| 7,447,211 | B1 | 11/2008 | Scholte |
| 2002/0083127 | A1 | 6/2002 | Agrawal |
| 2002/0089968 | A1 * | 7/2002 | Johansson et al. .......... 370/349 |
| 2002/0091956 | A1 | 7/2002 | Potter et al. |
| 2002/0155826 | A1 | 10/2002 | Robinson et al. |
| 2002/0165000 | A1 | 11/2002 | Fok |
| 2002/0173308 | A1 | 11/2002 | Dorenbosch et al. |

(Continued)

FOREIGN PATENT DOCUMENTS

| EP | 1 331 786 | 7/2003 |
| EP | 1 361 765 | 11/2003 |

(Continued)

OTHER PUBLICATIONS

Rosenberg, et al., "SIP: Session Initiation Protocol" Standards Track, The Internet Society, Jun. 2002, pp. 1-269.

(Continued)

Primary Examiner — Abdullah Riyami
(74) Attorney, Agent, or Firm — Stattler-Suh PC

(57) ABSTRACT

A server-based architecture for mobile conferencing is presented. Session-based mobile conferencing is established by transmitting necessary server network address information through page-mode based messaging services to establish connections among the various mobile devices with the server.

20 Claims, 4 Drawing Sheets

Related U.S. Application Data

Mar. 28, 2005, now Pat. No. 7,672,255, which is a continuation-in-part of application No. 11/042,620, filed on Jan. 24, 2005, now Pat. No. 7,773,550, and a continuation-in-part of application No. 10/935,342, filed on Sep. 7, 2004, now Pat. No. 7,764,637, and a continuation-in-part of application No. 10/817,994, filed on Apr. 5, 2004, now Pat. No. 7,961,663.

(56) References Cited

U.S. PATENT DOCUMENTS

| | | |
|---|---|---|
| 2002/0173319 A1 | 11/2002 | Fostick |
| 2003/0013467 A1 | 1/2003 | Caloud |
| 2003/0018726 A1 | 1/2003 | Low et al. |
| 2003/0076367 A1 | 4/2003 | Bencze et al. |
| 2003/0105812 A1 | 6/2003 | Flowers et al. |
| 2003/0126213 A1 | 7/2003 | Betzler |
| 2003/0142654 A1* | 7/2003 | Chambers et al. ............ 370/338 |
| 2003/0154293 A1 | 8/2003 | Zmolek |
| 2003/0217174 A1 | 11/2003 | Dorenbosch et al. |
| 2004/0005877 A1 | 1/2004 | Vaananen |
| 2004/0116137 A1 | 6/2004 | Bells et al. |
| 2004/0126213 A1 | 7/2004 | Pelzmann et al. |
| 2004/0132468 A1 | 7/2004 | Rogalski et al. |
| 2004/0152477 A1 | 8/2004 | Wu et al. |
| 2004/0171396 A1 | 9/2004 | Carey et al. |
| 2004/0240417 A1* | 12/2004 | Kim ............................. 370/338 |
| 2004/0249953 A1 | 12/2004 | Fernandez et al. |
| 2005/0005014 A1 | 1/2005 | Holmes et al. |
| 2005/0014490 A1 | 1/2005 | Desai et al. |
| 2005/0015495 A1 | 1/2005 | Florkey et al. |
| 2005/0021645 A1 | 1/2005 | Kulkarni et al. |
| 2005/0050152 A1 | 3/2005 | Penner et al. |
| 2005/0058094 A1 | 3/2005 | Lazaridis et al. |
| 2005/0094625 A1 | 5/2005 | Bouat |
| 2005/0105509 A1* | 5/2005 | Crocker et al. ............... 370/352 |
| 2005/0113123 A1 | 5/2005 | Torvinen |
| 2005/0135348 A1* | 6/2005 | Staack ......................... 370/353 |
| 2005/0190706 A1 | 9/2005 | Henderson et al. |
| 2005/0197143 A1 | 9/2005 | Lee et al. |
| 2006/0019698 A1 | 1/2006 | Ahya et al. |
| 2006/0053225 A1 | 3/2006 | Poikselka et al. |
| 2006/0063539 A1 | 3/2006 | Beyer, Jr. |
| 2006/0104306 A1 | 5/2006 | Adamczyk et al. |
| 2006/0126594 A1 | 6/2006 | Tu |
| 2006/0194596 A1* | 8/2006 | Deng ........................... 455/466 |
| 2006/0218282 A1 | 9/2006 | Teinila et al. |
| 2007/0106727 A1 | 5/2007 | Mainard |
| 2007/0112962 A1 | 5/2007 | Lewontin |
| 2007/0233732 A1 | 10/2007 | Porter et al. |
| 2009/0161663 A1* | 6/2009 | Tu ................................ 370/352 |

FOREIGN PATENT DOCUMENTS

| | | |
|---|---|---|
| WO | WO 01/41477 | 6/2001 |
| WO | WO 01/69406 | 9/2001 |
| WO | WO 03/087972 | 10/2003 |
| WO | WO 2004/073288 | 8/2004 |

OTHER PUBLICATIONS

Provisional U.S. Appl. No. 60/503,366, filed Sep. 16, 2003.
Provisional U.S. Appl. No. 60/503,367, filed Sep. 16, 2003.
Rosenberg, et al., "Traversal Using Relay NAT (TURN)" draft-rosenberg-midcom-turn-07, Midcom Feb. 21, 2005, pp. 1-33.

* cited by examiner

MOBILE CONFERENCING METHOD AND SYSTEM

CROSS REFERENCE TO RELATED APPLICATIONS

This application is a continuation of U.S. patent application 13/079,767, filed on Apr. 4, 2011, now U.S. Pat. No. 8,018,877 which is a continuation of U.S. patent application Ser. No. 12/691,594, filed on Jan. 21, 2010, now U.S. Pat. No. 7,940,704, which is a continuation of U.S. patent application Ser. No. 11/091,242, filed Mar. 28, 2005, now U.S. Pat. No. 7,672,255, which is a continuation-in-part of: U.S. patent application Ser. No. 11/042,620, filed Jan. 24, 2005, now U.S. Pat. No. 7,773,550; U.S. patent application Ser. No. 10/935,342, filed Sep. 7, 2004, now U.S. Pat. No. 7,764,637; and U.S. patent application Ser. No. 10/817,994, filed Apr. 5, 2004, now U.S. Pat. No. 7,961,663. All of the foregoing applications are hereby incorporated by reference.

FIELD OF THE INVENTION

The present invention relates generally to messaging and other data transfer techniques for mobile devices, and more specifically, a server-based architecture to establish a mobile conferencing session or other data exchange session among multiple mobile devices across private networks.

BACKGROUND OF THE INVENTION

According to a recent IDC Research report, the U.S. mobile instant messaging ("IM") market was predicted to reach $365 million in 2004 and is expected to reach $1.2 billion by 2008. However, the current paradigm for IM, adoption of which has been so successful in the desktop PC environment and which cell phone manufacturers have only just begun to offer access to in mobile devices as of the filing date of this patent application, is not easy to use in the mobile environment. In particular, the current IM paradigm is encumbered by the constraint that one can only communicate with those who are currently (i) online, (ii) logged on to same IM service such as AOL's Instant Messenger (AIM), Yahoo! Messenger or MSN Messenger, and (iii) included as a "buddy" on one's "buddy list."

Patent application Ser. No. 10/817,994, entitled "Peer-to-Peer Instant Messaging Method and Device" (hereinafter, the P2P patent application) provides techniques for a new paradigm for mobile IM that eliminates these limitations and operates in a manner that all are familiar with—the cell phone. For example, in one embodiment of the P2P patent application, by opening a TCP/IP port on one's smart phone and sending the TCP/IP address and port (whether permanent or temporary) to a recipient's phone number through the Short Message Service (SMS), one is able to develop an IM system wherein (i) the initiator dials the cell phone number of the recipient (i.e., sending the SMS message containing the TCP/IP address and port), (ii) the recipient's cell phone rings (i.e., the recipient receives the SMS message), and (iii) if the recipient chooses, he is able answer the call and engage in a real-time text conversation, just like a typical voice call (i.e., the recipient's smart phone extracts the TCP/IP address and port from the SMS message and establishes a direct TCP/IP connection with the initiator). This new yet familiar paradigm essentially turns the restrictive "buddy list" of the current IM paradigm into the entire cellular network.

However, peer-to-peer techniques such as those described in the P2P patent application also have their limitations. Specifically, with pure peer-to-peer IM techniques, it is more difficult to implement a commercially viable IM system that efficiently incorporates the capability to communicate in a real-time messaging session with more than two devices (i.e., adding conferencing capabilities to an IM system). Additionally, to the extent service providers dynamically allocate private IP addresses (rather than allocate public Internet IP addresses) to mobile devices through Network Address Translation (NAT) or any other network address allocation techniques, peer-to-peer IM techniques such as those described in the P2P patent application will only work within the private network of the service provider since the private IP addresses allocated to a mobile device will not be properly resolved by a receiving mobile device residing on a separate private network with a separate service provider. As such, what is needed is a server-based IM architecture based upon the core teachings of the P2P patent application to address the conferencing and private network limitations discussed above.

SUMMARY OF THE INVENTION

The present invention provides a method for establishing a real-time session-based IM system or data exchange system between mobile devices over a digital mobile network system that supports data packet-based communications. One method for of initiating a data exchange session among mobile devices comprises receiving a request from an initiating mobile device to allocate a session identifier to use in a data exchange session with a participating mobile device, transmitting the session identifier to the initiating mobile device, wherein the initiating mobile device uses a page-mode messaging service to assist in communicating the session identifier to the participating mobile device and wherein the page-mode messaging service utilizes a unique identifier to locate the participating mobile device; establishing connections with the initiating mobile device and the participating mobile device based on the session identifier; and facilitating the data exchange session between the initiating mobile device and the participating mobile device

DETAILED DESCRIPTION OF THE INVENTION

A. Network Environment

Figure 1:
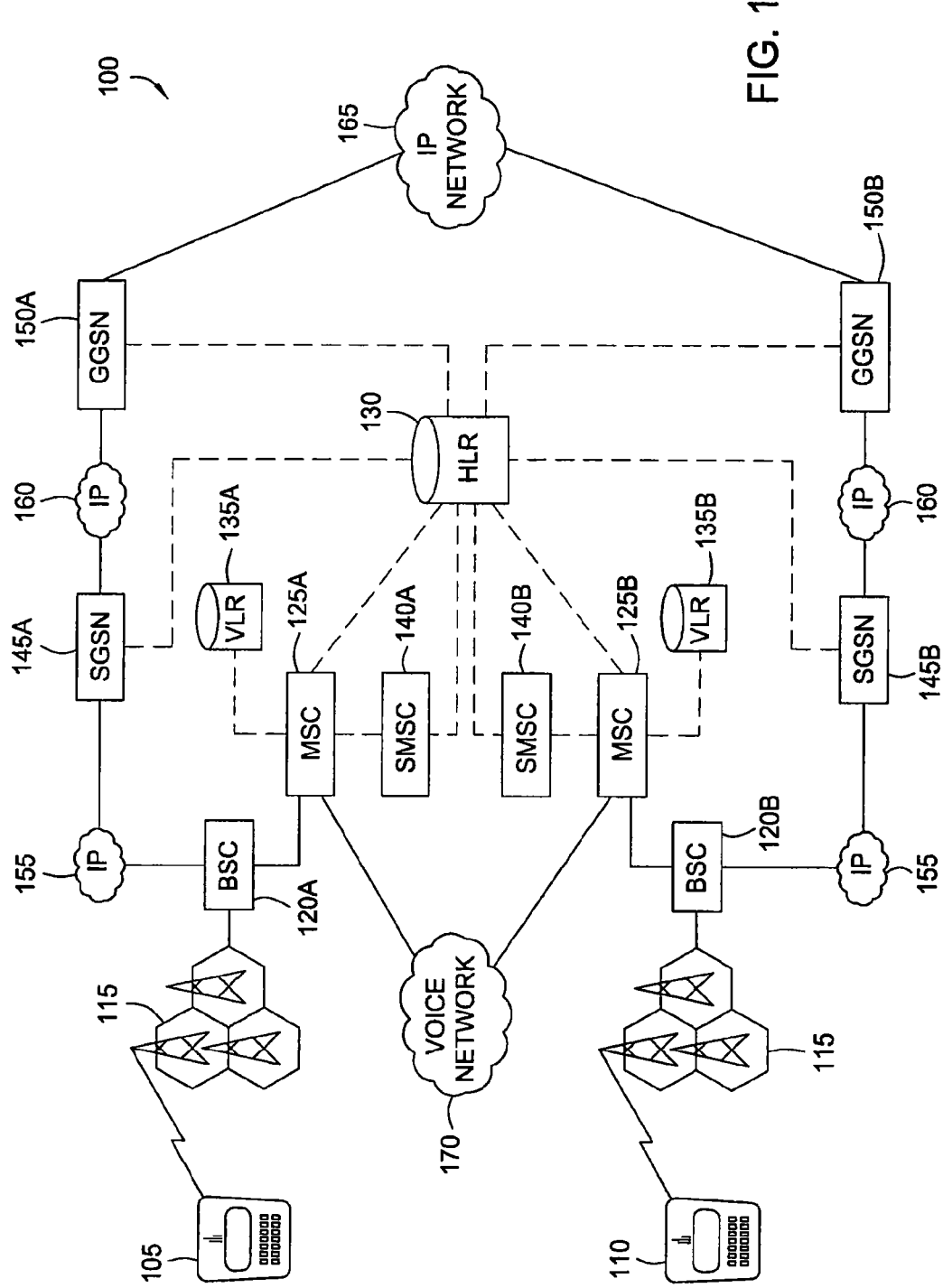
FIG. 1 depicts a diagram of an environment for establishing an instant messaging conferencing system or data exchange system in accordance with the present invention between a first mobile device and a second mobile device in a GSM mobile network system supporting GPRS as a data packet-based communications service, SMS as a page-mode messaging service, and TCP/IP as an underlying data packet based network protocol.

FIG. 1 depicts one environment to deploy an embodiment of the present invention. As depicted, the underlying digital mobile network system in this environment is the Global System for Mobile communications (GSM) 100 standard.

Under the GSM standard, each of the mobile devices 105 and 110 includes a Subscriber Information Module (SIM) card that contains unique identification information that enables the GSM system to locate the mobile devices within the network and route data to them. A current commercial example of a mobile device (e.g., smartphone, PDA, handheld, etc.) that might be used in FIG. 1 could be Research In Motion's (RIM) BlackBerry handheld devices, which include a QWERTY keyboard to facilitate the typing of text. As depicted, a GSM architecture includes the following components: base transceiver stations (BTS) 115 and base station controllers (BSC) (120A or 120B) for managing the transmission of radio signals between the MSC (defined below) and the mobile devices, mobile service-switching centers (MSC) (125A and 125B) for performing the all switching functions and controlling calls to and from other telephone and data systems, a home location register (HLR) 130 for containing all the administrative, routing and location information of each subscriber registered in the network, visitor location registers (VLR) (135A and 135B) for containing selected administrative information about subscribers registered in one HLR who are roaming in another HLR, and an equipment identity register (EIR) (not shown) for containing a list of all valid mobile equipment on the network). As depicted in FIG. 1, in one architecture of a GSM network, there may be exist one HLR while there may exist multiple MSCs (each with a related VLR) which each serves a different geographic area. The MSCs also provide the interface for the GSM network to more traditional voice networks 170 such as the PSTN. This underlying GSM architecture provides radio resources management (e.g., access, paging and handover procedures, etc.), mobility management (e.g., location updating, authentication and security, etc.), and communication management (e.g., call routing, etc.) in order to enable mobile devices in the GSM network to send and receive data through a variety of services, including the Short Message Service (SMS), an asynchronous bi-directional text messaging service for short alphanumeric messages (up to 160 bytes) that are transported from one mobile device to another mobile device in a store-and-forward fashion.

A GSM network within which the present invention may be deployed would also support a page-mode messaging service, such as SMS, that relies upon the underlying GSM mechanisms to resolve routing information in order to locate destination mobile devices. A GSM network supporting SMS text messaging may further include the following SMS specific components: a short message service center (SMSC) (140A or 140B) for storing and forwarding messages to and from one mobile device to another and an SMS Gateway-MSC (SMS GMSC) for receiving the short message from the SMSC (140A or 140B) and interrogating the destination mobile device's HLR 130 for routing information to determine the current location of the destination device to deliver the short message to the appropriate MSC (125A or 125B). The SMS GMSC is typically integrated with the SMSC 140. In a typical transmission of an SMS text message from an originating mobile device 105 to a receiving mobile device 110, (i) the text message is transmitted from the mobile 105 to the MSC 125A, (ii) the MSC 125A interrogates its VLR 135A to verify that the message transfer does not violate any supplementary services or restrictions, (iii) the MSC 125A sends the text message to the SMSC 140A, (iv) the SMSC 140A, through the SMS GMSC, interrogates the receiving mobile device's HLR 130 (by accessing the SS7 network) to receive routing information for the receiving mobile device 110, (v) the SMSC sends the text message to the MSC 125B servicing receiving mobile device 110, (vi) the MSC 125B retrieves subscriber information from the VLR 135B, and (vii) the MSC 125A transmits the text message to the receiving mobile device 110. Similar to other transactions on the GSM network, SMS text messaging utilizes telephone numbers as identifying addresses for mobile devices and as such, utilizes the SS7 network signaling system through which cellular service providers share information from the HLR with other service providers. As depicted in FIG. 1, SS7 based signaling communication is represented by the broken lines. In contrast, the solid lines in FIG. 1 represent data or voice based communications.

In addition to a page-mode messaging service such as SMS, a GSM network within which the present invention may be deployed would also support a data packet based communications service, such as the General Packet Radio Service (GPRS), that enables TCP/IP transmission protocol based communications between mobile devices within the network. As depicted in FIG. 1, a core GPRS network exists in parallel to the existing GSM core network. The BSC 120 may direct voice traffic through the MSC (125A or 125B) to the GSM network and data traffic through the Serving GPRS Support Note (SGSN) (145A or 145B) to the GPRS network. Such communication between the BSC (125A or 125B) and the SGSN (145A or 145B) may be, for example, based upon the IP network protocol communication 155. As such, GPRS signaling and data traffic do not flow through the core GSM network. Instead, the core GSM network is used by GPRS only for table look-up in the HLR 130 and VLR (135A or 135B) to obtain routing, location and other subscriber information in order to handle user mobility. The SGSN (145A or 145B) serves as a "packet-switched MSC," delivering data packets to mobile devices in its service area. The Gateway GPRS Support Note (GGSN) (150A or 150B) communicates with the SGSN (145A or 145B) through an IP based GPRS backbone 160 and serves as an interface to other external IP networks 165 such as the Internet and other mobile service providers' GPRS services.

B. Server Based Architecture

Figure 2:
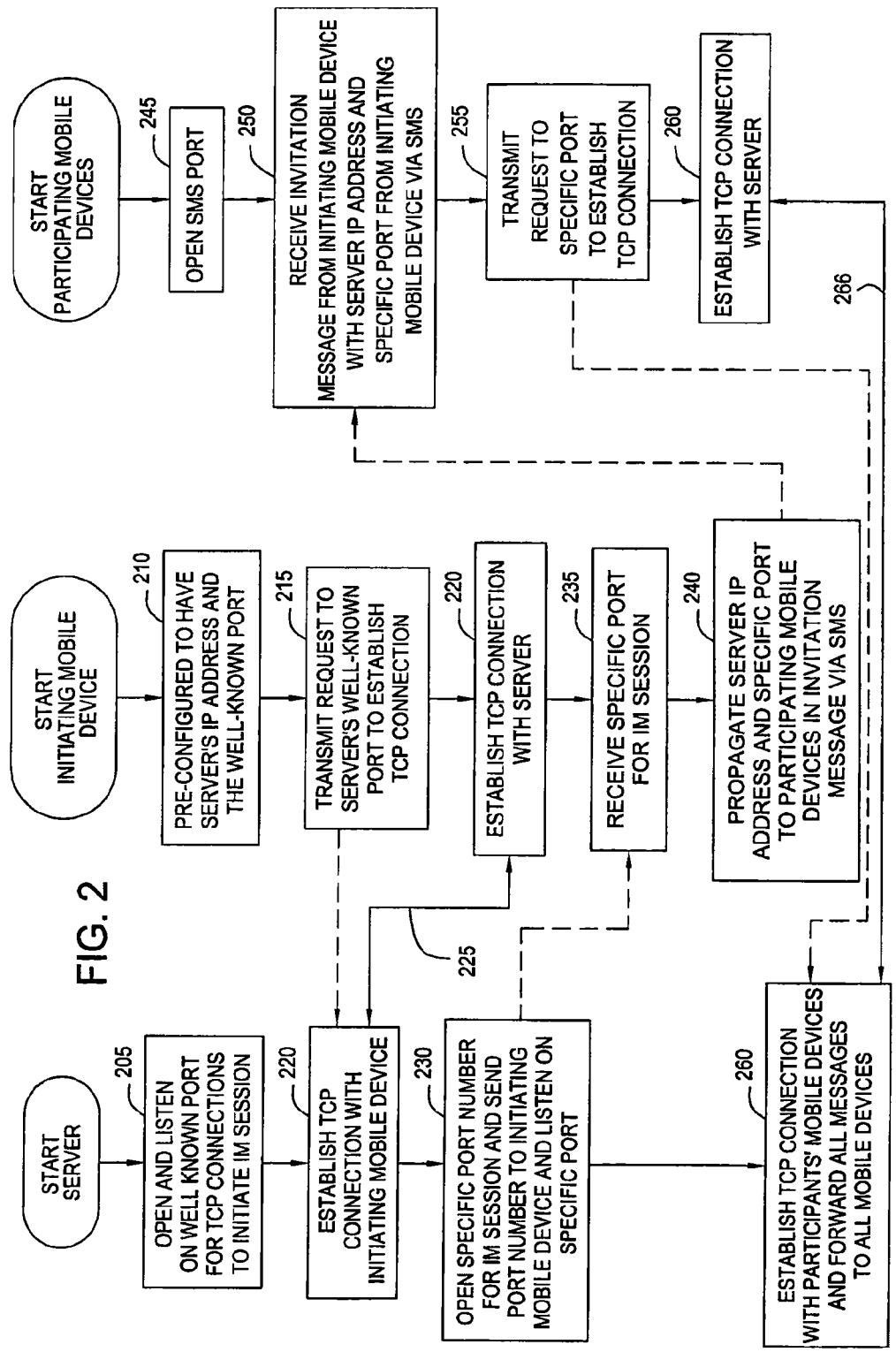
FIG. 2 depicts a flow chart for a first embodiment of a server based architecture in accordance with the present invention.

Because mobile service providers do not typically allocate publicly accessible network addresses to each mobile device, the present invention requires the presence of a server with a publicly accessible network address (e.g., public Internet IP address) that enables the server to be contacted across all private data packet based networks (e.g., IP networks). FIG. 2 depicts a flow chart setting forth one embodiment of a server-based architecture in accordance with the present invention. As an initial set-up process, the server will need to have opened and be listening on a well-known port (e.g., server socket) for requests by mobile devices to initiate particular IM sessions 205 and the client software residing on an initiating mobile device will need to be pre-configured with the server's IP address and well-known port 210 (it is not necessary that mobile devices other than the initiating mobile device be pre-configured with the server's IP address and well-known port). To initiate an IM session, the initiating mobile device transmits a request to establish a reliable session-based connection (e.g., TCP connection) with the server by contacting the server at its network address and well-known port 215. The server receives the connection request from the initiating mobile device and establishes a reliable connection (e.g., TCP connection) with the initiating mobile device 220. Upon establishing the reliable connection 225, the server allocates and opens a specific network port number (e.g., a server socket) for the IM session and transmits the port number (and, if needed, the server's IP address) to the initiating mobile device through the reliable connection 230. In this embodiment, the specific network port number may be considered to be session identifying information for the IM session being initiated by the initiating mobile device. Similar to the teachings in the P2P patent application, the initiating mobile device receives the specific port number 235 and then propagates the server's network address and the specific network port number in invitation messages through a page-mode messaging service, such as SMS, to other mobile devices in order to participate in the IM session 240. Such page-mode messages (e.g., SMS message) may be encoded in a manner such that the mobile devices can distinguish the message from page-mode messages used for purposes other than the present invention, or the page mode-message may be sent to a specific page-mode message port (e.g., SMS port) opened specifically for purposes of this present invention 245. The other mobile devices receive the invitation message 250 and if they desire to participate in the IM session, they transmit requests to establish reliable connections (e.g., TCP connections) 255 with the server by connecting with the server at the specific network port number allocated to the initiating mobile device 260. Once the reliable connections 266 with other participating mobile devices are established, the server acts as a manager of the IM session, keeping track of all the established connections relating to the specific port number and IM session and forwarding all messages (via reliable connections 225 and 266) exchanged among the mobile devices that are communicating within that particular IM session. The server keeps the specific network port for an IM session open so long as mobile devices that have connected to each other through that network port remain engaged in a real-time IM session. Because all participating mobile devices know the server's IP address and the specific allocated port number associated with the IM session, any of such participating mobile devices and invite other mobile devices to join by sending an invitation message through the page-mode messaging service. Furthermore, those skilled in the art will recognize that security enhancements may be added to the foregoing initiating process between the server and the mobile devices. For example and without limitation, a nonce can be issued by the server to the initiating mobile device which is then propagated to other participating mobile devices. This nonce would be used to confirm that any mobile device attempting to join the IM session by connecting related established port was indeed invited to participate.

Figure 3:
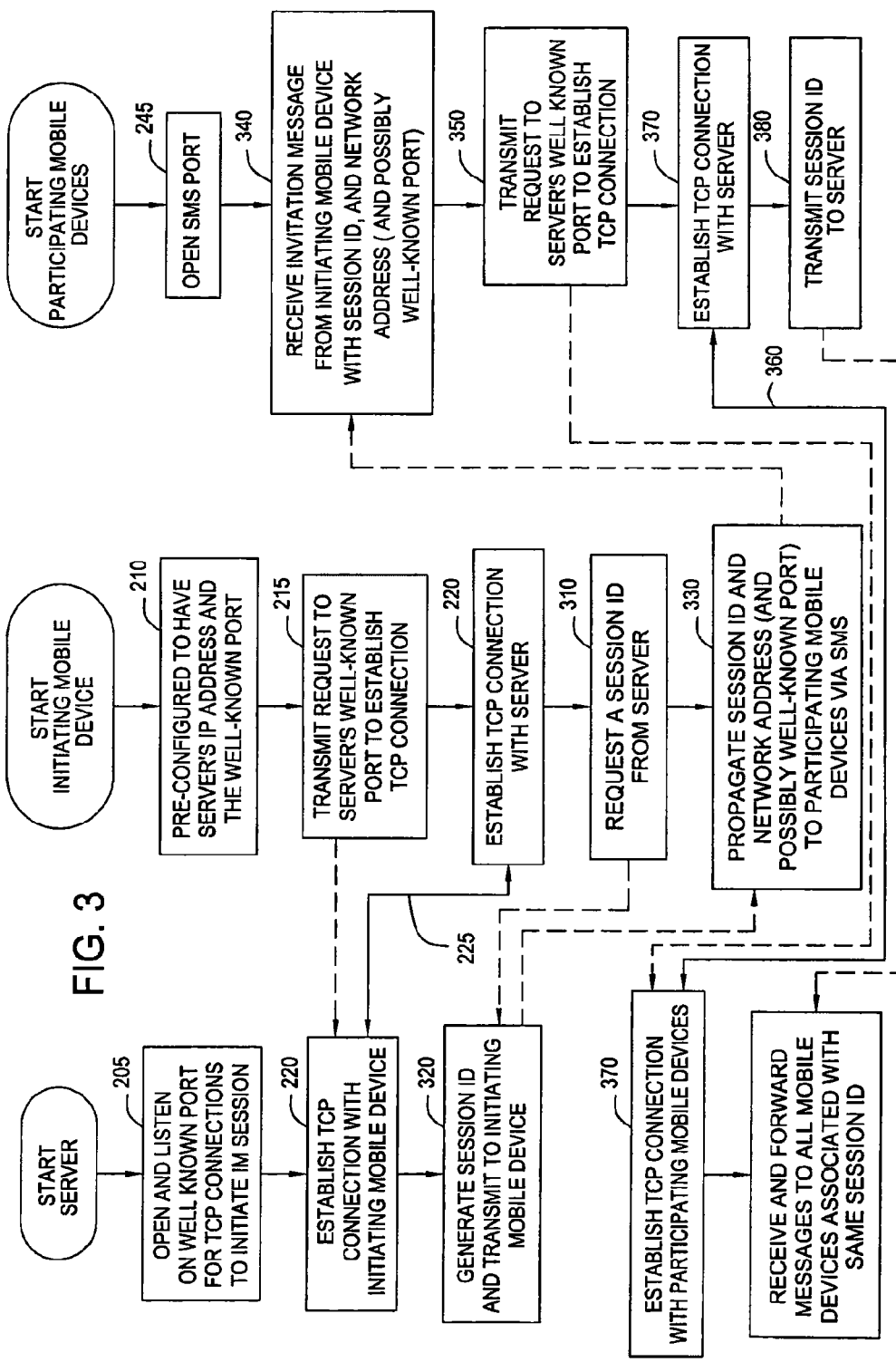
FIG. 3 depicts a flow chart for a second embodiment of a server-based architecture in accordance with the present invention.

FIG. 3 depicts a flow chart setting forth an alternative embodiment of a server-based architecture in accordance with the present invention. Upon establishing the reliable connection in a manner similar to FIG. 2, the initiating mobile device requests a session identification number ("Session ID") from the server to initiate an IM session 310, and the server generates such a Session ID and transmits the Session ID to the initiating mobile device through the reliable connection 320. Whereas the specific port opened by the server in the embodiment of FIG. 2 was the session identifying information, the session identifying information in the embodiment of FIG. 3 is the Session ID. The initiating mobile device will then propagate the server's network address (possibly including the well-known port) and the Session ID in invitation messages through a page-mode messaging service, such as SMS, to other mobile devices 330. The other mobile devices receive the invitation message 340 and if they desire to participate in the IM session, they will extract the network's address from the page-mode message and transmit a request to establish a reliable connection (e.g., TCP connection) with the server by contacting the server at the server's network address and well-known port 350. Once a reliable connection 360 is established with the server and a participating mobile device 370, the participating mobile device and identifies its intent to join an initiated IM session by transmitting the Session ID 380 to the server through the connection 360. The server acts as a manager of the IM session, keeping track of all the connections relating to the Session ID and forwarding all messages exchanged among the mobile devices that are communicating within that particular IM session.

A server in accordance with the present invention, such as those in FIG. 2 and FIG. 3 can be maintained by any entity, from a mobile device service provider to any entity that desires to offer IM conferencing services in accordance with the present invention. So long as the server has a publicly accessible network address (e.g., public Internet IP address), the server need not be part of any particular mobile device's private network (e.g., service provider's mobile data network) and any mobile device associated with any service provider shall be able to connect to the server through the data packet-based network (e.g., IP network) and request the allocation of a specific port or Session ID to establish an IM session. In another embodiment of the present invention, the maintainer of the server may also provide personal conferencing numbers and PIN numbers to users to provide the capability to schedule and set up "virtual IM conference rooms." In such an embodiment, the server also has associated with it at least one unique identification number (e.g., telephone number) that may be used by mobile devices to contact the server through the page-mode messaging service (e.g., SMS). For example, initially through an offline process (e.g., email, phone call, letter, etc.), the maintainer of the server provides a mobile device user with a phone number associated with the server (e.g., a toll-free number), a personal conference number, and a PIN. Those skilled in the art in the teleconferencing area will recognize the existence of alternative combinations of identification numbers for creating a virtual conference room such as a personal phone number (rather than a common number used by all users) and a PIN, but no personal identification number. Such alternatives can be made without departing from the spirit of the present invention and are therefore considered to be within the scope of the present invention.

Figure 4:
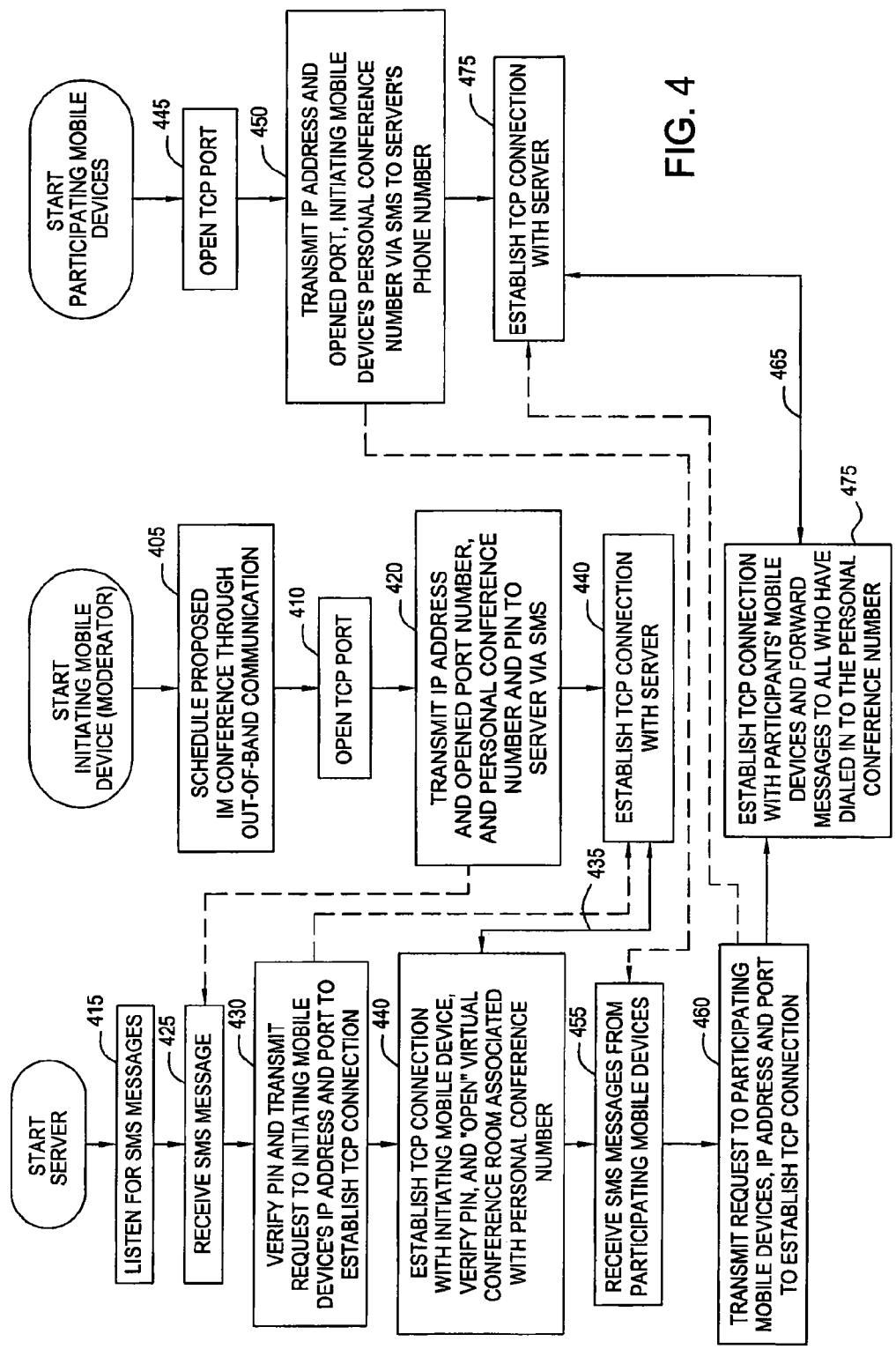
FIG. 4 depicts a flow chart for a third embodiment of a server-based architecture with virtual IM conference room capabilities in accordance with the present invention.

FIG. 4 provides a flow chart of a server-based architecture with virtual IM conference room capabilities in accordance with the present invention. Initially, through an offline or out-of-band process (e.g., email, phone call, letter, etc.) a user of an initiating mobile device, having the role of the "moderator," will schedule a proposed time for the IM conference and distribute the server's phone number and the user's personal identification number to all participants 405. At the time of the scheduled conference, the initiating mobile device opens a TCP port (e.g., server socket) to listen for subsequent communications from the server 410. The server has similarly opened an SMS listening port to receive SMS text messages requesting virtual IM conference rooms to be opened 415. The initiating mobile device then transmits its IP address, including its TCP port number, the user's personal conference number and the user's PIN (to authenticate the user as the moderator) in an SMS text message to the telephone number of the server 420. In the embodiment described in FIG. 4, the user's personal conference number and PIN may be considered session identifying information. The server receives the SMS text message containing the initiating mobile device's IP address, personal conference number and PIN 425. The server extracts the IP address, personal conference number and PIN from the SMS text message, confirms that the PIN is correct for the specific personal conference number and then transmits a request to establish a TCP connection to the initiating mobile device's IP address (and specified TCP port number) 430. The initiating mobile device receives this request and a TCP connection 435 is established between the initiating mobile device and the server and the virtual conference room associated with the user's personal conference number is "opened" 440. Participants in the scheduled IM conference other than the moderator "dial in" to the IM conference in a similar manner. At the time of the scheduled conference, a participant's mobile device opens a TCP port to listen for subsequent communications from the server 445. The participant's mobile device then transmits its IP address, including its TCP port number and the moderator's personal conference number in an SMS text message to the phone number of the server 450. The server receives the SMS text message containing the participant's mobile device's IP address and moderator's personal conference number 455. The server extracts the IP address and personal conference number from the SMS text message and then transmits a request to establish a TCP connection to the participant's mobile device's IP address 460. If the moderator has "opened" the virtual IM conference room, then the server announces to all currently connected participants that a new participant has joined the conference room and propagates text messages to all participants through the various TCP connections (465 and 435) established with the server 475. Those skilled in the art will recognize that the information that is embedded in the initial SMS text message can vary and that other information can be exchanged once the TCP connection between the server and the mobile device is established. For example, only the IP address (and port) may be transmitted to the server in the initial SMS text messages and thereafter, the user may be prompted by the server to manually enter the appropriate personal conference number or PIN number through the TCP connection. Additionally, to the extent participating mobile devices are not allocated publicly accessible IP addresses by service providers such that the server can establish a reliable connection (e.g., TCP connection) with such devices, a different "intermediary" server with a public network address (similar to FIG. 2 and FIG. 3) may be used by each participating mobile device to obtain a publicly accessible IP address (e.g., the intermediary server's IP address), transmit that IP address in its SMS message, and have all communication with the conferencing server routed to the mobile device through the intermediary server. Such alternatives can be made without departing from the spirit of the present invention and are therefore considered to be within the scope of the present invention.

Those skilled in the art will recognize that such a conferencing server in accordance with the present invention may be implemented in software and may reside on the same hardware platform as any firewall, NAT or any other hardware router.

While the foregoing detailed description has described the present invention using SMS, GSM, GPRS, and TCP/IP, other similar services and protocols may be used in a variety of similar environments in which the present invention may be implemented. For example and without limitation, rather than using SMS to transmit an IP address (and port) from the initiating mobile device to the listening mobile device through the devices' telephone numbers, an alternative embodiment of the present invention might use a PIN-to-PIN messaging technology (as, for example, offered in RIM's Blackberry handheld devices) to transmit the IP address (and port) through unique PIN numbers associated with the mobile devices, or an alternative paging protocol using telephone numbers. Furthermore, the present invention contemplates that the actual protocol used during an established IM session may also vary depending upon the preference of the implementation. For example and without limitation, Message Session Relay Protocol (MSRP) or any proprietary based protocol may be used during the IM session that is established in accordance with the present invention. Furthermore, those skilled in the art will recognize that the server-based architecture presented herein can apply to other data exchange environments contexts (other than instant messaging) where reliable connections between multiple mobile devices are desirable (e.g., mobile multiplayer gaming). Additionally, the present server-based architecture may also be used with endpoints (e.g., PCs, workstations, etc.) other than mobile devices, so long as such endpoints have the requirements as described herein (e.g., phone number associated with such endpoint, SMS capabilities, TCP/IP connections, etc.). Thus, various modifications, additions and substitutions and the like can be made without departing from the spirit of the invention and these are therefore considered to be within the scope of the invention as defined in the following claims.

What is claimed is:

1. A method of initiating a data exchange session among mobile devices, the method comprising:
    receiving, at a server, a request from an initiating mobile device to allocate a session identifier to use in a data exchange session with a participating mobile device, wherein the session identifier comprises a network port number of the server;
    transmitting, from the server, the session identifier to the initiating mobile device, wherein the initiating mobile device uses a page-mode messaging service to assist in communicating the session identifier to the participating mobile device and wherein the page-mode messaging service utilizes a unique identifier to locate the participating mobile device;
    establishing, at the server, connections with the initiating mobile device and the participating mobile device based on the session identifier; and
    facilitating, at the server, the data exchange session between the initiating mobile device and the participating mobile device.

2. The method of claim 1, wherein the page-mode messaging service may be utilized to transmit page-mode messages to devices for purposes unrelated to participating in the data exchange session.

3. The method of claim 2, wherein the page-mode messaging service transmits a page-mode message to the participating mobile device that is encoded to be recognized by software on the participating mobile device configured to participate in the data exchange session.

4. The method of claim 1, wherein additional devices are invited to participate in the data exchange session.

5. The method of claim 1, wherein the server is a non-mobile device.

6. The method of claim 1, wherein the unique identifier utilized by the page-mode messaging service is associated with a telephone number of the participating mobile device.

7. The method of claim 1, wherein the session identifier further comprises an IP address.

8. A non-transitory computer-readable medium including instructions for initiating a data exchange session among mobile devices, which when executed cause a processor to perform the steps of:
    receiving, at a server, a request from an initiating mobile device to allocate a session identifier to use in a data exchange session with a participating mobile device, wherein the session identifier comprises a network port number of the server;

transmitting, from the server, the session identifier to the initiating mobile device, wherein the initiating mobile device uses a page-mode messaging service to assist in communicating the session identifier to the participating mobile device and wherein the page-mode messaging service utilizes a unique identifier to locate the participating mobile device;

establishing, at the server, connections with the initiating mobile device and the participating mobile device based on the session identifier; and facilitating, at the server, the data exchange session between the initiating mobile device and the participating mobile device.

9. The non-transitory computer-readable storage medium of claim 8, wherein the page-mode messaging service may be utilized to transmit page-mode messages to devices for purposes unrelated to participating in the data exchange session.

10. The non-transitory computer-readable storage medium of claim 9, wherein the page-mode messaging service transmits a page-mode message to the participating mobile device that is encoded to be recognized by software on the participating mobile device configured to participate in the data exchange session.

11. The non-transitory computer-readable storage medium of claim 8, wherein additional devices are invited to participate in the data exchange session.

12. The non-transitory computer-readable storage medium of claim 8, wherein the server is a non-mobile device.

13. The non-transitory computer-readable storage medium of claim 8, wherein the unique identifier utilized by the page-mode messaging service is associated with a telephone number of the participating mobile device.

14. The non-transitory computer-readable storage medium of claim 8, wherein the session identifier further comprises an IP address.

15. A server configured to facilitate a data exchange session among mobile devices, the server comprising:

an input port to receive a request from an initiating mobile device to allocate a session identifier to use in a data exchange session with a participating mobile device, wherein the session identifier comprises a network port number of the server; and an output port to transmit the session identifier to the initiating mobile device, wherein the initiating mobile device uses a page-mode messaging service to assist in communicating the session identifier to the participating mobile device and wherein the page-mode messaging service utilizes a unique identifier to locate the participating mobile device; and a computer for:

establishing connections with the initiating mobile device and the participating mobile device based on the session identifier; and facilitating the data exchange session between the initiating mobile device and the participating mobile device.

16. The server of claim 15, wherein the page-mode messaging service may be utilized to transmit page-mode messages to devices for purposes unrelated to participating in the data exchange session.

17. The server of claim 16, wherein the page-mode messaging service transmits a page-mode message to the participating mobile device that is encoded to be recognized by software on the participating mobile device configured to participate in the data exchange session.

18. The server of claim 15, wherein additional devices are invited to participate in the data exchange session.

19. The server of claim 15, wherein the server is a non-mobile device.

20. The server of claim 15, wherein the unique identifier utilized by the page-mode messaging service is associated with a telephone number of the participating mobile device.

* * * * *